(12) United States Patent
Coronado et al.

(10) Patent No.: US 6,806,227 B2
(45) Date of Patent: Oct. 19, 2004

(54) SOLID MATERIALS FOR REMOVING METALS AND FABRICATION METHOD

(75) Inventors: Paul R. Coronado, Livermore, CA (US); John G. Reynolds, San Ramon, CA (US); Sabre J. Coleman, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 142 days.

(21) Appl. No.: 10/285,242

(22) Filed: Oct. 30, 2002

(65) Prior Publication Data

US 2003/0087756 A1 May 8, 2003

Related U.S. Application Data

(60) Provisional application No. 60/337,361, filed on Nov. 5, 2001.

(51) Int. Cl.[7] ................................................. B01J 20/02
(52) U.S. Cl. ....................................... 502/405; 502/408
(58) Field of Search ................................. 502/232, 214, 502/405, 408; 252/60, 184, 182.3, 182.35

(56) References Cited

U.S. PATENT DOCUMENTS

| | | | |
|---|---|---|---|
| 5,015,448 A | | 5/1991 | Vorlop et al. |
| 5,494,863 A | | 2/1996 | Mathur |
| 5,496,397 A | * | 3/1996 | Fischer et al. ................ 96/154 |
| 5,679,281 A | * | 10/1997 | Levin et al. ................ 252/184 |
| 5,960,368 A | | 9/1999 | Pierce et al. |
| 6,171,647 B1 | | 1/2001 | Holman |
| 6,197,415 B1 | | 3/2001 | Holman |

FOREIGN PATENT DOCUMENTS

| | | |
|---|---|---|
| DE | 3937863 A1 | 6/1990 |
| WO | WO 00/09241 A1 | 2/2000 |

OTHER PUBLICATIONS

Pekala et al, "Carbon Aerogels For Electrochemical Applications". Journal of Non–Crystalline Solids, North–Holland Publishing Company, Amsterdam, NL, vol. 225, No. 1–3, Apr. 15, 1998, pp. 74–80.

"Dibutyl Phosphoric Acid Solubility in High–Acid, Uranium–Bearing Solutions At SRS", #WSRCTR9800281, Oct. 2, 1996.

C. A. Toles et al, Phosphoric Acid Activation of Nutshells for Metals and Organic Remediation: Process Optimization, J. Chem. Technol. Biotechnol. 1998, 72, 255–263, no month.

C. J. Briner, G.W. Scherer, Sol–Gel Science. The Physics and Chemistry of Sol Gel Processing, ISBN: 0–12–134970–5 (1989), no month.

J. G. Reynolds, Recent Research Developments in Non–Crystalline Solids, ISBN: 81–7895–028–6j, no date.

G. Tchobanoglous and F.L. Burton, Water Quality, Characteristics, Modeling and Modification ISBN: 0–201–054337 (1985), no month.

L. W. Hrubesh et al, Organic Solvent Removal from Water with Hyrophobic Silica Aerogels, ISA6 Aerogel Conference 2000–hrubesh abstract p. 1–2, no month.

* cited by examiner

Primary Examiner—Stanley S. Silverman
Assistant Examiner—Edward M. Johnson
(74) Attorney, Agent, or Firm—Ann M. Lee; Alan H. Thompson; James S. Tak

(57) ABSTRACT

Solid materials have been developed to remove contaminating metals and organic compounds from aqueous media. The contaminants are removed by passing the aqueous phase through the solid materials which can be in molded, granular, or powder form. The solid materials adsorb the metals and the organics leaving a purified aqueous stream. The materials are sol-gel and or sol-gel and granulated activated carbon (GAC) mixtures. The species-specific adsorption occurs through specific chemical modifications of the solids tailored towards the contaminant(s). The contaminated solid materials can then be disposed of or the contaminant can be removed and the solids recycled.

17 Claims, 3 Drawing Sheets

SOLID MATERIALS FOR REMOVING METALS AND FABRICATION METHOD

RELATED APPLICATION

This application relates to U.S. Provisional Application No. 60/337,361 filed Nov. 5, 2001, and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the removal of contaminants, particularly to the removal of contaminants from an aqueous media, and more particularly to the removal of contaminating metals and organic compounds from an aqueous media using solid material, which may be in the form of sol-gel and/or sol-gel and with solid support mixtures, which may be in the form of granulated activated carbon (GAC).

In recent years, substantial effort has been directed to the removal of contaminants from an aqueous media, such as ground water. Numerous "Superfund" sites have been established because of contamination of ground water by various materials. The main contaminants are metals, particularly uranium and hexavalent chromium, volatile organic compounds (VOCs), high explosive compounds, nitrates, perchlorates, and tritium, as well as various commercial and manufacturing waste contaminants.

Presently, granular activated carbon (GAC), ion-exchanged resins, air-strippers, and bioremediation are used for contaminate removal. These work on many contaminants. However, there is not an readily available cost-effective remedy for uranium.

GAC has been commercially used as an adsorbent for contaminants in water. It is cheap and treatment technology hardware is readily available commercially for its use. Even though GAC is a good adsorbent medium for many contaminants, such as VOCs, it is not efficient for certain metals, particularly uranium. Thus, there has been a need for a material by which contaminating metals and certain organic compounds may be removed from aqueous media.

The present invention provides a solution to this need by providing a material that can be used alone or with GAC to make it a good adsorbent for uranium, for example, without loosing the affinity for other contaminants. The material is a sol-gel and/or sol-gel and GAC mixture.

Sol-gels or aerogels, as commonly known, by themselves have not in the past been cost-effective to use. However, in an example of a composite, made in accordance with the invention, only 20% or less is an aerogel and the composite is a much better adsorbent for uranium than the aforementioned treatment technologies.

SUMMARY OF THE INVENTION

It is an object of the present invention to provide for the removal of contaminant metals and organic compounds from aqueous media.

A further object of the invention is to provide solid materials for removal of contaminating metals and organic compounds from aqueous media.

Another object of the invention is to provide for the removal of uranium from aqueous media.

Another object of the invention is to provide a material composed of a sol-gel and/or a sol-gel and a solid support mixtures for removing contaminating metals and organic compounds from aqueous media.

Another object of the invention is to provide a material composed of a sol-gel and/or a sol-gel and granulated activated carbon mixtures for removing contaminating metals and organic compounds from aqueous media.

Other objects and advantages of the invention will become apparent from the following description and accompanying drawings. The invention involves the removal of contaminating metals, such as uranium, and organic compounds from aqueous media. The invention involves a solid material that may be in molded, granular, or powder form, and the solid material adsorbs the metal and the organics leaving a purified aqueous stream. The solid materials are sol-gel and/or sol-gel and granulated activated carbon (GAC) mixtures. After adsorbing the contaminants, the contaminated solid material can be disposed of or the contaminant can be removed and the solid materials recycled. The species-specific adsorption occurs through specific chemical modifications of the solid materials tailored towards the contaminant(s).

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
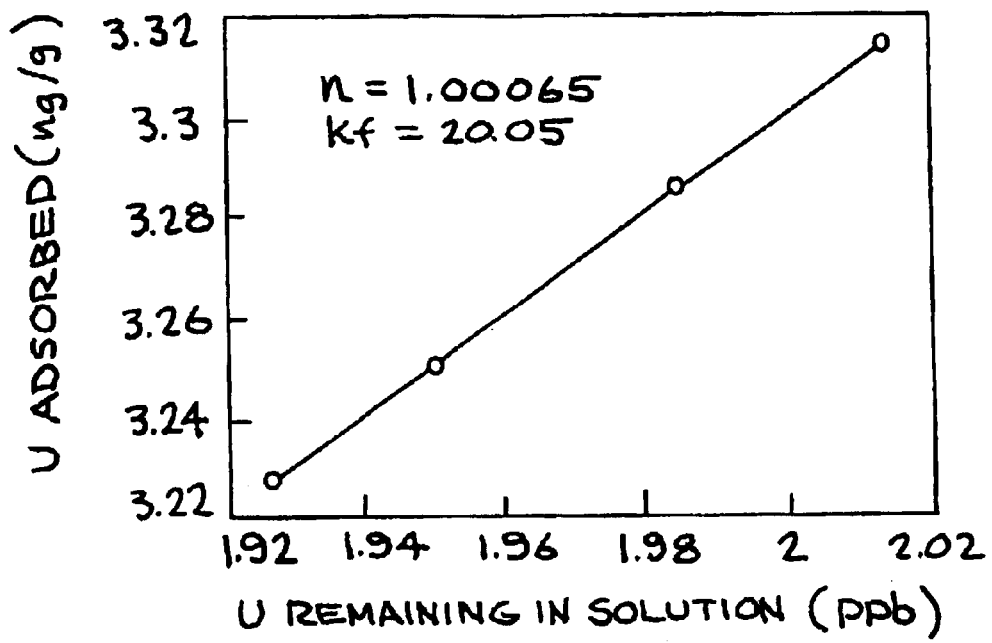
FIG. 1 shows a Freundlich isotherm plot for baseline granulated activated carbon (GAC).

The present invention involves removing contaminating metals, such as uranium, and organic compounds from aqueous media use a solid material and fabrication method therefor. The invention utilizes solid materials and the contaminants are removed by passing the aqueous phase through the solid materials, which materials may be in molded, granular, or powder form. The solid materials adsorb the metals and the organics leaving a purified aqueous stream. The solid materials are comprised of sol-gel and/or sol-gel and a solid support such as granulated activated carbon (GAC) mixtures. The species-specific adsorption occurs through specific chemical modifications of the solid materials tailored towards the contaminant of choice, such as uranium. The contaminated solid materials can then be disposed of or the contaminant can be removed and the solid materials recycled.

The solid materials can be used to cleanup any aqueous stream with environmentally damaging material, such as caused by commercial interests or military activities. For example, but not limited to, ground water with uranium or heavy metal contamination, volatile organic compounds (VOCs) contamination, ground water with gasoline or other fuel spills, waste storage tanks with uranium or heavy metals, and ground water or surface waters with petroleum product contamination or fuel spills.

The solid material of this invention may, for example, be composed of a silica sol-gel (aerogel) that has been modified to be hydrophobic and is activated by supercritical drying, and possible further modification is used separately or mixed with a solid support such as GAC, to remove contaminants, particularly uranium, from aqueous streams. The silica aerogel by itself in the past has not been cost-effective. However, in the composite with GAC, less than 20% of it is aerogel and the composite is a much better adsorbent for uranium of the aforementioned treatment technologies.

The aerogel/GAC composite is the preferred utilization being superior to previous treatment technologies, including GAC alone. GAC is a widely available commercial material that comes in many forms and from many sources. GAC by itself has been commercially used as an adsorbent for contaminants in water. It is inexpensive and the treatment technology hardware is readily available commercially for its use. It is a good media for adsorption of many other contaminants, such as VOCs, but without modification, it is not an efficient adsorbent of uranium.

Aerogels are nano-structured materials having high surface areas (around 500 m$^2$/g), low densities, and large meso pore structure. These nano-structured properties are configured in a three-dimensional structure giving ideal physical properties for adsorption. Through chemical modification, they can be designed to have species-specific binding, as well as discriminating bulk properties. Combining these properties, with the known adsorption properties of GAC as delineated by Tchobanoglous et al, Water Quality, Characteristics, Modeling and Modification, ISBN: 0-201-05433-7 (1985), makes the aerogel/GAC composite ideal for treating environmentally important systems such as ground water.

The key to the superior performance of the aerogel/GAC composite is being able to tailor the aerogel to be specific for the particular target clean-up stream. This stream can be aqueous with metal ions, aqueous with organic compounds, aqueous with metal ions and organic compounds, non-aqueous with the above contaminants. The aerogel/GAC composite design will depend upon the all the components of the stream. This invention is not limited to aqueous streams with uranium in them, but simply uses that as an example of the design of the aerogel/GAC composite for the specific application.

In the design of this aerogel/GAC composite, the aerogel is tailored to be hydrophobic and specific for adsorbing uranium. The backbone of the aerogel is formed by the hydrolysis condensation of tetra methoxy silane, or tetra ethoxy silane more commonly known as silica sol-gel chemistry. This serves as an example of a method to make the backbone. Other commonly used methods found in the literature such as taught by Brinker and Scherer, Sol-Gel Science, The Physics and Chemistry of Sol-Gel Processing, ISBN: 0-12-134970-5 (1989), are also viable. The hydrophobic component is formed by the addition of, but not limited to, a fluorinated substituent through co-condensation reaction for an example. The trifluoropropyl group is used only to demonstrate the effect of making the hydrophobic character, not to limit the method of production. Reynolds, Recent Research Developments in Non-Crystalline Solids, ISBN: 81-7895-028-6 (2001), teaches such common methods to make the material hydrophobic and other substituents found in the literature can also be used. The uranium adsorption site is formed by the incorporation of a uranium specific binding material into or onto the aerogel and/or the aerogel/GAC composite. Phosphoric acid, exchanged calcium nitrate, and diethyl phosphato ethylene triethoxy silane are used to demonstrate the viability of the approach. Other materials that have affinity for uranium can be used, preferably those materials that have affinity for other species in the cases where other metals and/or organics are targets for clean-up or separation. Other materials such as hydroxyapatite, calcium phosphate, and others can be used. The formation of the aerogel/GAC composite is made by combining the backbone, hydrophobic, and uranium binding components with the GAC. Co-gellation followed by supercritical extraction is an example, but not limited to, how this can be accomplished.

The following are examples of the solid material (aerogel) formulation of the invention in practice. These examples are not intended to be limiting nor necessarily optimum formulations. All samples were tested using a modified ASTM D 3860-98 method (Standard Practice for Determination of Adsorptive Capacity of Activated Carbon by Aqueous Phase Isotherm Technique). Stock solutions of uranium were prepared at either approximately 25, 50, or 100 ppb at pH 7 for sorption testing.

EXAMPLE 1

Baseline granulated activated carbon (GAC) was tested to establish the behavior of the adsorption industry standard for comparison. FIG. 1 shows the Freundlich isotherm plot, and derived parameters are:
n=1.001, and $K_f$=20.05.

EXAMPLE 2

Figure 2:
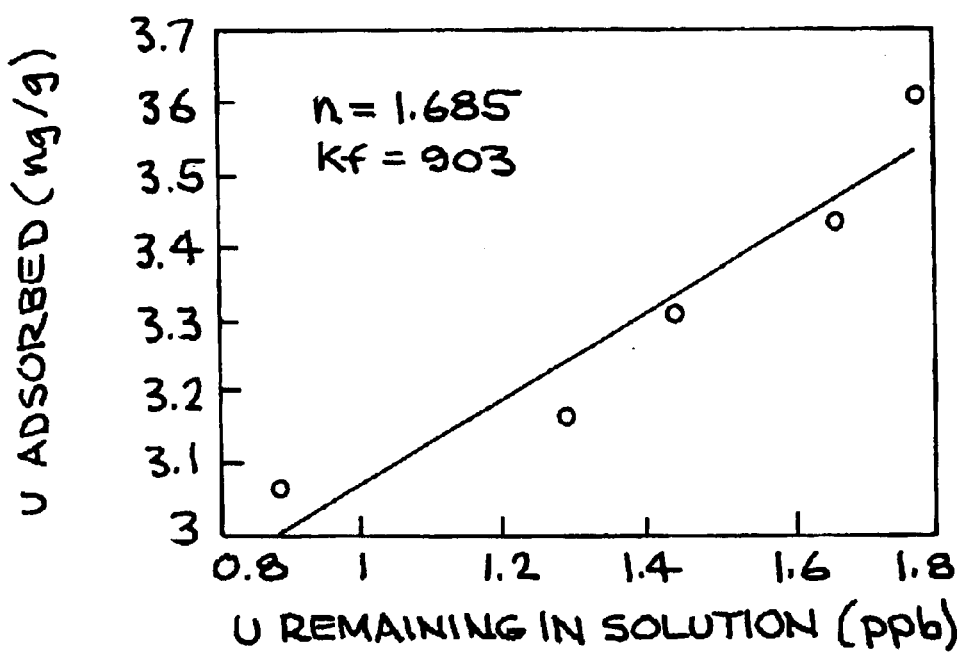
FIG. 2 shows a Freundlich isotherm plot for a 1% phosphoric acid and hydrophobic aerogel/GAC composite.

1% phosphoric acid and hydrophobic aerogel was prepared by the following method: 14.7 g $(CH_3O)_4Si$ and 3.14 g $(CH_3O)_3SiCH_2CH_2CF_3$ were mixed together and to this mixture, 18.0 g $CH_3OH$ were added and stirred. In a separate vessel, 36.0 g $CH_3OH$, 0.147 g $H_3PO_4$, 1.5 g $HBF_4$ were mixed together and stirred. After about 1 min., both solutions were poured into a supercritical-drying reactor containing 13.4 g of GAC. A vacuum was pulled, and the mixture gelled in less than 1 hour. The gelled mixture was then supercritically dried at 300° C. FIG. 2 shows the Freundlich isotherms and the derived parameters are: n=1.685, $K_f$=303.

EXAMPLE 3

Figure 3:
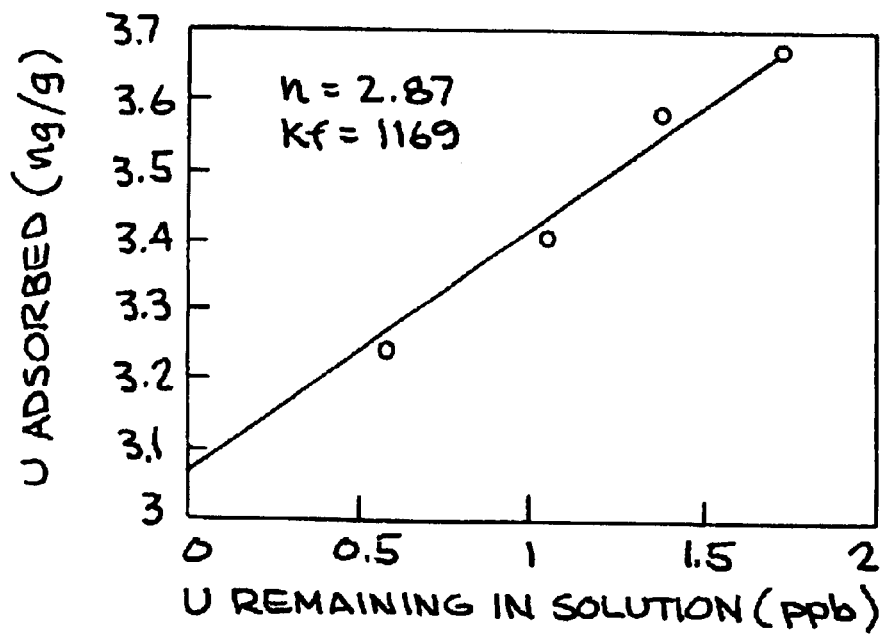
FIG. 3 shows a Freundlich isotherm plot for a 17% phosphoric acid and hydrophobic aerogel/GAC composite.

17% phosphoric acid and hydrophobic aerogel was prepared by the same method as in Example 2 except 2.5 g $H_3PO_4$ was used. FIG. 3 shows the Freundlich isotherms and the derived parameters are: n=2.87, $K_f$=1169.

EXAMPLE 4

Figure 4:
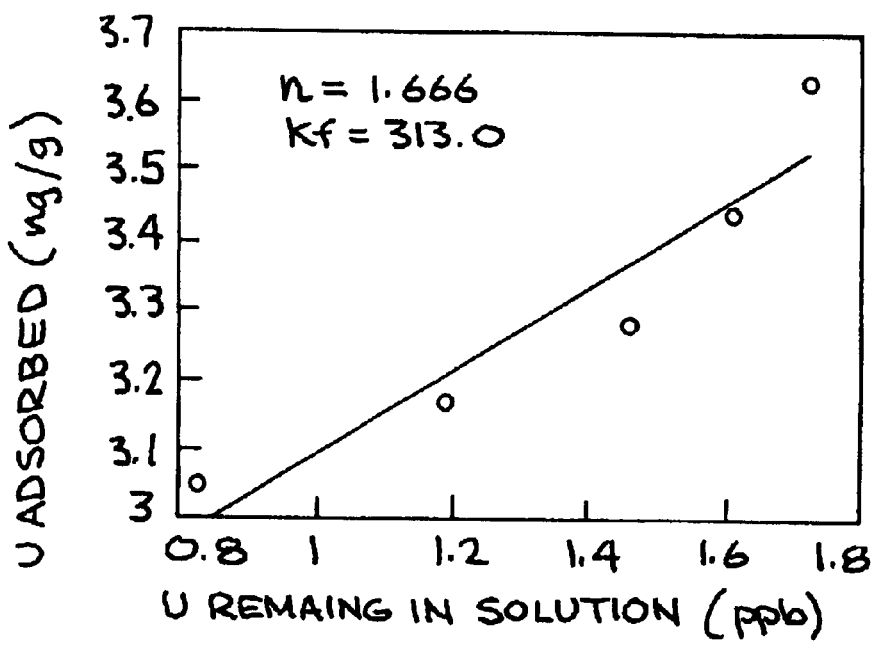
FIG. 4 shows a Freundlich isotherm plot for a phosphoric acid exchanged hydrophobic aerogel/GAC composite.

Phosphoric acid exchanged hydrophobic aerogel was prepared by the following method: 35.0 g $(CH_3O)_4Si$ and 7.55 g $(CH_3O)_3SiCH_2CH_2CF_3$ were mixed together and to this mixture, 44.1 g acetone were added and stirred. In a separate vessel, 30.9 g $H_2O$, 85.7 g acetone, 7.46 g $Ca(NO_3)_2$, 0.1 g $HBF_4$ were mixed together and stirred. After about 1 min., both solutions were poured into a supercritical-drying reactor containing 96.2 g of GAC. A vacuum was pulled, and the mixture gelled in less than 1 hour. The gelled mixture was then supercritically dried at 300° C. The dry sample was removed from the supercritical reactor, sieved to remove fines, and mixed with a 5% $H_3PO_4$ in acetone solution for 5 to 10 min. The solvent was decanted off, and the solid was washed with pure acetone and dried under vacuum. FIG. 4 shows the Freundlich isotherms and the derived parameters are: $n=1.666$, $K_f=313$.

EXAMPLE 5

Figure 5:
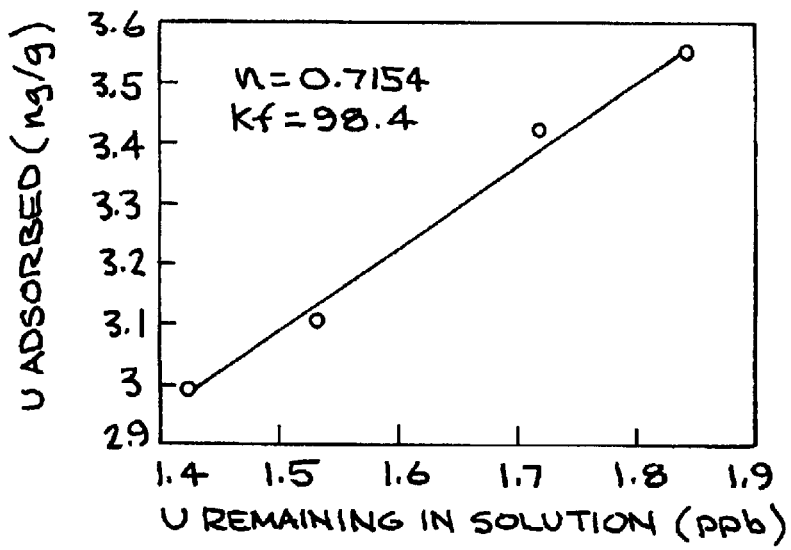
FIG. 5 shows a Freundlich isotherm plot for a functionalized phosphonate hydrophobic aerogel/GAC composite.

Functionalized phosphonate hydrophobic aerogel was prepared by the following method: 29.5 g $(CH_3O)_4Si$, 6.3 g $(CH_3O)_3SiCH_2CH_2CF_3$, and 6.3 g $(C_2H_5O)_3SiCH_2CH_2P(O)(OC_2H_5)_2$ were mixed together, and to this mixture, 36.0 g $CH_3OH$ were added and stirred. In a separate vessel, 17.5 g $H_2O$, 90.0 g $CH_3OH$, 0.0175 g $NH_4OH$ were mixed together and stirred. After about 1 min., both solutions were poured into a supercritical-drying reactor that contained 8.49 g of GAC. The mixture was then supercritically dried at 300° C. FIG. 5 shows the Freundlich isotherms and the derived parameters are: $n=0.715$, $K_f=98.4$.

EXAMPLE 6

Figure 6:
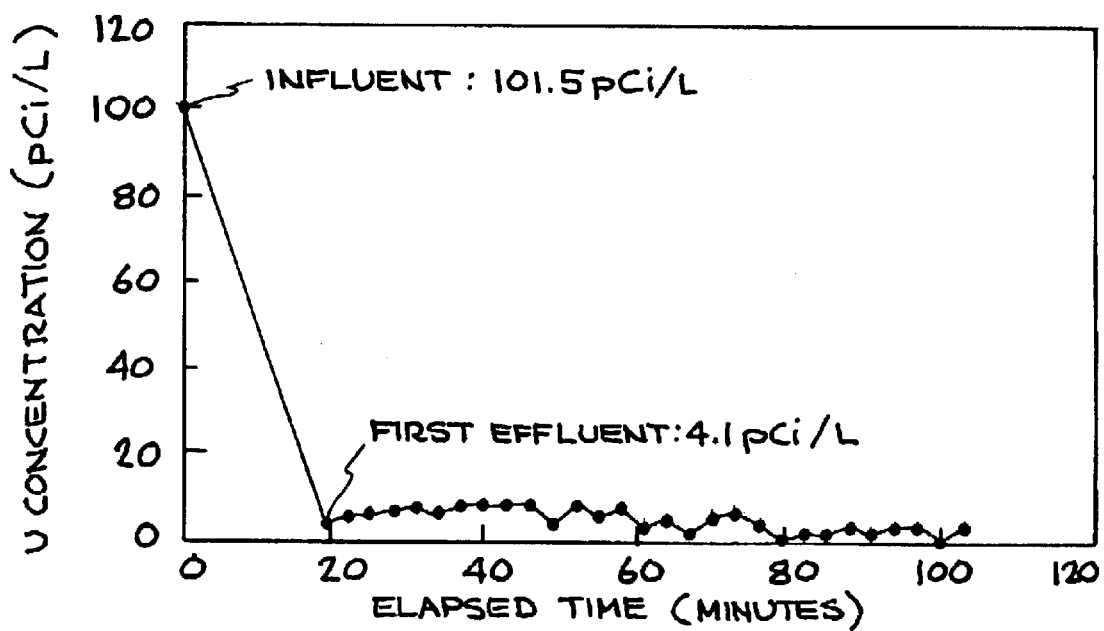
FIG. 6 shows a column test for a functionalized phosphate hydrophobic aerogel.

50 g of the aerogel/GAC composite from Example 3 was tested in a column reactor. A 101 pCi/L uranium solution at pH 7 was treated in a up-flow configuration. FIG. 6 shows the concentration of uranium in the effluent as a function of time on stream. The concentration was immediately reduced to 4 pCi/L and remained at that level through the entire run.

It has thus been shown that the aerogel (sol-gel) and granulated activated carbon (GAC) mixtures or composites provide a significant increase in adsorption of metals (uranium) over that of GAC alone, or over aerogel material alone. Thus, this invention enables contamination cleanup of materials such as uranium in addition to contaminants that can be adsorbed by GAC alone, thereby enabling multiple contaminant removal with the same material.

While particular examples have been set forth with particular materials, times, etc. to exemplify and teach the principles of the invention, such are not intended to be limiting. Modifications and changes may become apparent to those skilled in the art, and it is intended that the invention be limited only by the scope of the appended claims.

What is claimed is:

1. A composition comprising:
 a mixture consisting essentially of (1) a hydrophobic sol-gel functionalized with at least one metal-removing constituent or one organic compound removing constituent and (2) a support structure.

2. The composition recited in claim 1, wherein said mixture is molded, granular, or powdered.

3. The composition recited in claim 1, wherein said hydrophobic sol-gel is an aerogel.

4. The composition recited in claim 3, wherein the hydrophobic aerogel includes a quantity of phosphoric acid.

5. The composition recited in claim 3, wherein the hydrophobic aerogel is produced by adding a predetermined amount of phosphoric acid to a siloxane sol-gel mixture prior to gellation.

6. The composition recited in claim 3, wherein the hydrophobic aerogel includes a quantity of phosphonate.

7. The composition recited in claim 6, wherein the quantity of phosphonate incorporated in the aerogel is formed from the starting material $(C_2H_5O)_3SiCH_2CH_2P(O)(OC_2H_5)_2$.

8. The composition recited in claim 3, wherein the hydrophobic aerogel includes a quantity of phosphate exchangeable metal salt, said hydrophobic aerogel being functionalized by washing with a pre-determined amount of phosphoric acid.

9. The composition recited in claim 8, wherein the phosphate exchangeable salt is calcium nitrate.

10. The composition recited in claim 3, wherein the support structure is granulated activated carbon (GAC).

11. A composition comprising:
 a predetermined amount of a hydrophobic aerogel functionalized with at least one metal-removing constituent or at least one organic compound-removing constituent; and
 a predetermined amount of granulated activated carbon, wherein said composition is capable of removing metal species or organic compounds from aqueous media.

12. The composition recited in claim 11, wherein the hydrophobic aerogel is functionalized by adding material selected from the group consisting of phosphoric acid, phosphonate, and phosphate exchangeable metal salts to a sol-gel siloxane mixture prior to gellation.

13. A method comprising:
 forming a first mixture comprising a predetermined amount of a least one organosilane compound, a predetermined amount of an organosilane compound having a substituent capable of making an aerogel hydrophobic, and organic solvent;
 forming a second mixture comprising (1) a compound capable of binding at least one organic compound, a compound capable of binding at least one metal, or a compound capable of being modified to a compound capable of binding at least one metal after gellation and (2) an organic solvent;
 mixing the first mixture and the second mixture together with stirring for a predetermined amount of time to form a pre-aerogel mixture;
 combining said pre-aerogel mixture with a predetermined amount of a support structure to form a pre-aerogel/support structure mixture; and
 drying said pre-aerogel/support structure mixture under supercritical conditions to form a functionalized hydrophobic aerogel/support structure solid material capable of removing metals or organic compounds from an aqueous media.

14. The method recited in claim 13, wherein said support structure is granulated activated carbon (GAC).

15. The method recited in claim 13, wherein said compound capable of binding at least one metal is selected from the group consisting of a predetermined amount of phosphoric acid and a compound containing a phosphonate.

16. The method recited in claim 13, wherein said compound capable of being modified to a compound capable of binding at least one metal after gellation is a phosphate exchangeable salt.

17. The method recited in claim 16, wherein said phosphate exchangeable salt is calcium nitrate.

* * * * *